(12) United States Patent
Grover

(10) Patent No.: US 12,337,804 B1
(45) Date of Patent: Jun. 24, 2025

(54) STONE REMOVAL SYSTEM

(71) Applicant: John Grover, Vestal, NY (US)

(72) Inventor: John Grover, Vestal, NY (US)

( * ) Notice: Subject to any disclaimer, the term of this patent is extended or adjusted under 35 U.S.C. 154(b) by 365 days.

(21) Appl. No.: 18/104,294

(22) Filed: Jan. 31, 2023

Related U.S. Application Data

(60) Provisional application No. 63/391,380, filed on Jul. 22, 2022.

(51) Int. Cl.
*B60S 1/68* (2006.01)

(52) U.S. Cl.
CPC ...................................... *B60S 1/68* (2013.01)

(58) Field of Classification Search
CPC ........................................................ B60S 1/68
See application file for complete search history.

(56) References Cited

U.S. PATENT DOCUMENTS

| | | | | |
|---|---|---|---|---|
| 2,738,986 A * | 3/1956 | Pelton | ........................ | B60S 1/68 280/856 |
| 2,839,313 A * | 6/1958 | Walko | ........................ | B60S 1/68 280/856 |
| 3,014,697 A * | 12/1961 | Goff | .......................... | B60S 1/68 254/113 |
| 3,913,943 A * | 10/1975 | Tamburino | ................ | B60S 1/68 301/36.3 |
| 4,079,642 A * | 3/1978 | Scott | ........................ | B25B 13/52 81/64 |
| 4,529,170 A * | 7/1985 | Whitt, Sr | .................. | F16H 7/14 269/131 |
| 4,714,016 A * | 12/1987 | Bond | ...................... | B65B 27/10 100/32 |
| 4,900,203 A * | 2/1990 | Pope | ....................... | B60R 9/048 D34/33 |
| 5,188,394 A * | 2/1993 | Roche | ....................... | B60S 1/68 280/856 |
| 5,242,153 A * | 9/1993 | Stuart | ..................... | B66F 19/00 254/131 |
| 7,533,606 B2 * | 5/2009 | Wright | .................... | B60C 25/01 100/32 |
| 8,186,267 B2 * | 5/2012 | Wright | ................ | B60C 25/0509 29/802 |
| 11,279,326 B1 * | 3/2022 | Siegel, Jr. | ................. | B60S 1/68 |
| 2005/0040695 A1* | 2/2005 | Kinoshita | ............... | B60B 11/00 301/36.3 |
| 2015/0344002 A1* | 12/2015 | Montgomery | .......... | B60S 3/042 15/104.001 |

* cited by examiner

*Primary Examiner* — Jacob B Meyer
(74) *Attorney, Agent, or Firm* — Laurence C. Begin

(57) ABSTRACT

A stone removal system contains a frame, a winch unit fixed to the frame and in one embodiment containing a belt spooled about a ratcheted reel, and, a spool tightening tool. The frame is adapted to be leveraged against dual tires and the belt is adapted to be trained and tightened about an object stuck between a dual tire configuration on a truck, tractor, bus, or other vehicle to thereby provide an improvement in removing objects stuck between the dual tires.

20 Claims, 4 Drawing Sheets

STONE REMOVAL SYSTEM

CROSS-REFERENCE TO RELATED APPLICATIONS

This application claims the benefit and priority of U.S. Provisional Patent Application No. 63/391,380 having a filing date of Jul. 22, 2022, and herein incorporated by reference.

FIELD OF THE INVENTION

The present invention relates to a novel development in removing stones, rocks, and other road debris from between the tires on large land vehicles including semi-trailer trucks and buses.

BACKGROUND OF THE INVENTION

One of the most frequently encountered hazards with large trucks or buses is the trapping of a stone, rock, wood, or other road debris between dual tires on the truck, trailer, or bus. Dual tires are mounted on dual wheels that are welded together near the center of the hub of each wheel. As a result, the junction of the two tires and two wheels presents an area that potentially collects road debris. Oftentimes, paved roads in disrepair may yield stones, blacktop, and cement rocks, as may off-road paths such as construction sites and so forth. Such an object will generally remain lodged between the tires while the truck is operating at low speed and may typically be dislodged by centrifugal force once the truck accelerates to a higher speed, as when the truck begins operating on paved surfaces. The dislodged object may become a hazardous projectile if the object is dislodged at high speed, wherein the object may be thrown rearward, or possibly forward, from the truck into the path of trailing, or oncoming traffic. Various methods and tools have been developed to assist in removing the stones or debris from between the tires. However, certain tools do not respond to the inability of the user to fully leverage the force of the tool because of limited space between the tires, or to limited space beneath the truck or trailer, for example.

Stones and other road debris frequently lodge between the tires carried by dual wheels of truck and other vehicles, thereby causing such wheels to become unbalanced. It is well known that left unchecked, the resultant imbalance between the wheels may cause the tires to wear unevenly thereby causing the tires to wear out prematurely, needing to be discarded, and also potentially causing blowouts of the affected tires due to uneven wear. Given the cost of replacing the large tires of trucks or buses, it is therefore desirable that the tires remain in and be maintained in proper balance. Unbalanced vehicle wheels also may interfere with the smooth operation of the vehicle, thereby further increasing the costs of maintenance and operation of the vehicle. Scattered pieces of ruptured tires may also present road hazards, creating a safety issue both on the road and as the tire fragments are released from the wheels.

Yet further, multi-terrain vehicles such as tractors, bulldozers, and heavy machinery drive over different kinds of terrain while accomplishing various tasks. As a multi-terrain vehicle drives over various kinds of terrain, again, objects and debris may become lodged or otherwise stuck in different components or parts of the multi-terrain vehicle. If the lodged or stuck objects and debris continue accumulating, between the tires in a dual-tire configuration for example, without being removed or cleaned, it is possible that the accumulated debris may inhibit the performance of the multi-terrain vehicle. In fact, the large build-up of debris on the multi-terrain vehicle may negatively affect the drivability of the multi-terrain vehicle and the usability of components or features of the multi-terrain vehicle. To illustrate, continued build-up of debris between the tires may increase the weight of the dual tires, and therefore the vehicle, thereby causing the vehicle to sink deeper than optimal into unpaved terrain. As a result, the inner wall of one or both of the tires in the dual-tire configuration may wear down resulting in costly repair(s). Additionally, the accumulated debris may fill the tire treads thereby reducing the traction provided by the dual-tire configuration. Yet further, the tires again may need to be changed for new tires, requiring additional maintenance and down time of the vehicle, and also increasing the operating costs. Yet further, the time typically needed to remove the accumulated debris from the treads and junction between the tires, with state-of-the-art methods and tools, is time consuming and reduces productivity.

Known methods and devices for removing such objects include the insertion of a lever between the dual tires, which may be used to dislodge the object. However, in the case where the tires are located under a truck body or trailer body, the amount of leverage and the angles at which the leverage must be applied with regard to a respective tool, may not be able to be fully utilized or even available in these confined spaces to thereby remove the object(s) from between the dual tires.

Another method known for dislodging such an object stuck between the tires of a dump-truck, for example, is to raise the truck bed, secure a chain to the bed behind the tilting point, train the chain about the object, secure the chain, and lower the bed. This effectively removes the object, although if the bed is loaded, there may not be enough tilting available to remove an object in a single try, and may then require multiple attempts to remove the object.

The primary object of the present invention is to provide a rock removing device for use with trucks or other vehicles having dual sets of wheels, one which overcomes the aforementioned challenges and quickly removes objects lodged between the dual tires.

Another object of the invention is to provide such an apparatus which is lightweight, compact, inexpensive to manufacture, and easy to use.

A further object of the invention is to provide such an apparatus which will enable removal of an object between the tires in a safe and efficient manner.

RELATED ART

U.S. Pat. No. 2,738,986 describes a rock-removing device for dual truck tires. The vertical-adjusted device is labor intensive in that it must be fixed to the bed of the truck above the dual-tire junction to remove the stone or rock from between the tires.

US Pub. No. 20050040695 describes a labor-intensive foreign matter removing device for dual truck tires. The device is connected to the bed of a truck and about the foreign matter, and the truck bed must be elevated to the point that the foreign matter stuck between the dual truck tires is forcefully removed.

US Pub. No. 20150344002 describes a labor-intensive device containing an extendable and rotatable arm vertically extending from the ground, with a cradle for framing and biasing an object stuck between dual tires on a truck. Once the cradle has been fixed about the object, the truck must be moved forward or aft to rotate the arm and force the expulsion of the object from between the tires.

U.S. Pat. No. 3,014,697 describes a rock-removing device for removing rocks or stones stuck between dual tires. A lever is leveraged against the periphery of the tires to pivot a hook member hooked about an object stuck between the tires. The device contains a plurality of rigid arms that affect the lever action against the object for removal thereof. One problem is that in confined spaces, the lever action is compromised by restricted range of motion or restricted extension of the lever, whereby removal of the object, if at all possible, is made much more difficult.

U.S. Pat. No. 5,242,153 describes a dual-tire foreign object or rock removing apparatus. A lever is leveraged against the periphery of the tires to constrict a web or belt wrapped about an object stuck between the tires. The device contains a plurality of rigid arms that affect the lever action against the object for removal thereof. One problem is that in confined spaces, the lever action is compromised by restricted range of motion or restricted extension of the lever, whereby removal of the object, if at all possible, is made much more difficult.

U.S. Pat. No. 11,279,326 describes a scraper attached to a vehicle above the junction defined between a dual tire configuration. A paddle extends from the scraper and removes objects that tend to accumulate in the junction.

SUMMARY

The objects and other improvements are achieved by a stone-removing device that is used to remove stones, rocks, and other debris from the between dual tires of a large vehicle such as a tractor trailer truck, tractor, bus, or other vehicle. The winch-like stone-removing device contains a frame that includes a strap spooled about a reel fixed to the frame. A tough hook is sewn or otherwise fixed to an open end of the strap, and a D-ring is slidably received about the strap, between the reel and the open end of the strap. Accordingly, the strap is adapted to be secured about an object such as a stone stuck between the dual tires, by wrapping the strap about an object stuck between the dual tires, and hooking the hook to the D-ring. The strap is then tightened about the object, and wrapped about the spool to force and remove the object from between the dual tires.

DETAILED DESCRIPTION OF THE INVENTION

Figure 1:
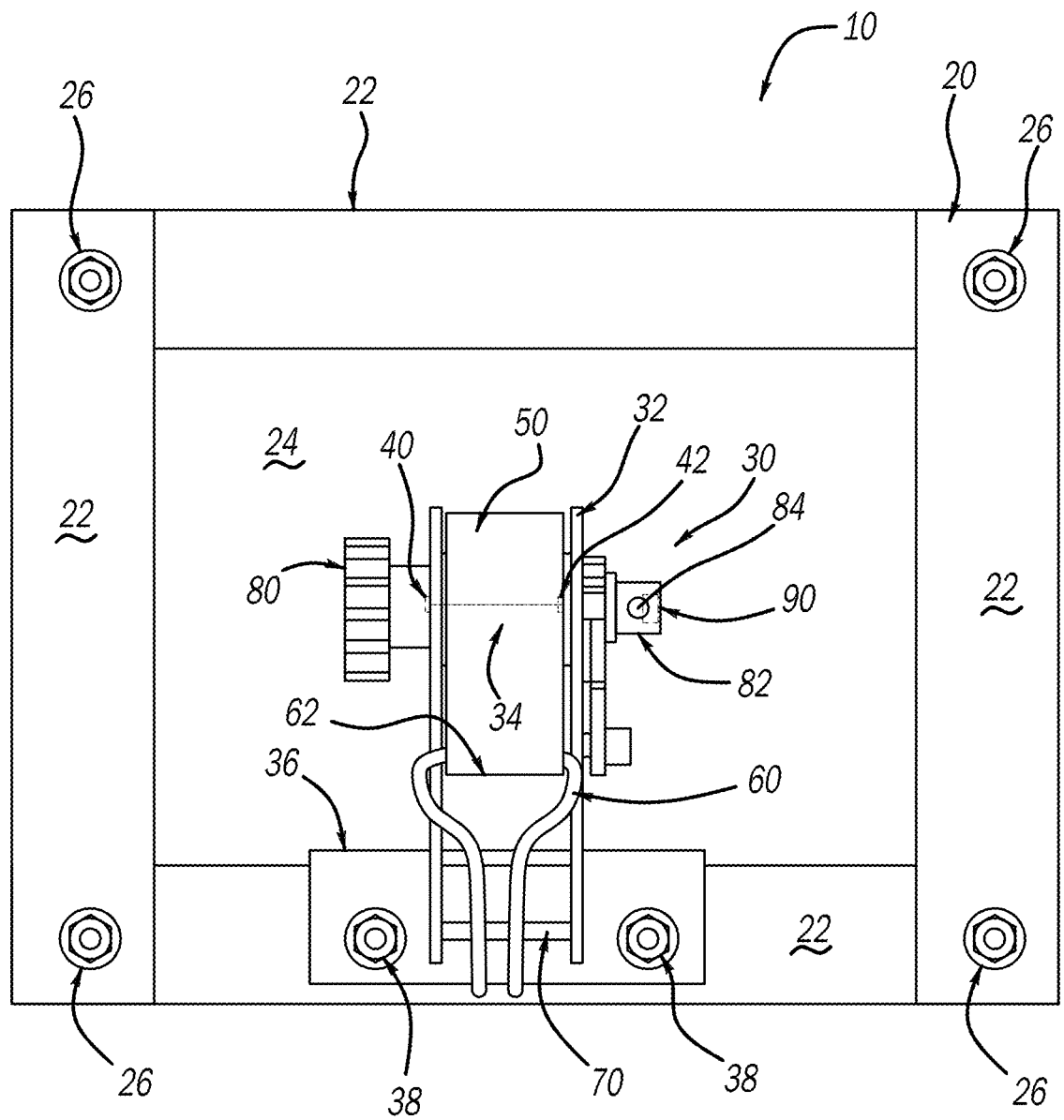
FIG. 1 is a first view of a stone-removing device according to the present invention showing the hook of the winch-like unit.

As shown in the Figures, and in accordance with the present invention, an improved stone-removing device 10 or stone-removing system 100 for a dual-tire configuration on a tractor trailer truck, bus, or other large vehicle, is presented. Accordingly, the objects stated above and other advantages are provided by the present invention. For purposes of this invention, a dual-tire configuration comprises two wheels welded or otherwise fixed to each other at their respective hubs, with a tire on each wheel. A frame 20 provides a structure to fix, weld, or bolt thereon a winch-like unit 30, such as a ratchet 30, for example. A plurality of frame members 22 when fixed to each other by bolts/nuts 26 or welds, for example, form the rectangular frame 20. The frame 20 may, but not by limitation, be sized at about 12 inches by 10 inches, for example. An opening 24 is defined and bordered by the frame members 22. A winch bracket 36 fixed to the winch unit 30 is bolted, welded, or otherwise fixed to one of the four frame members 22 by bolts/nuts 38, and is generally oriented within the middle of the opening 24, whereby the winch unit 30 is thereby fixed to the frame 20.

Figure 3:
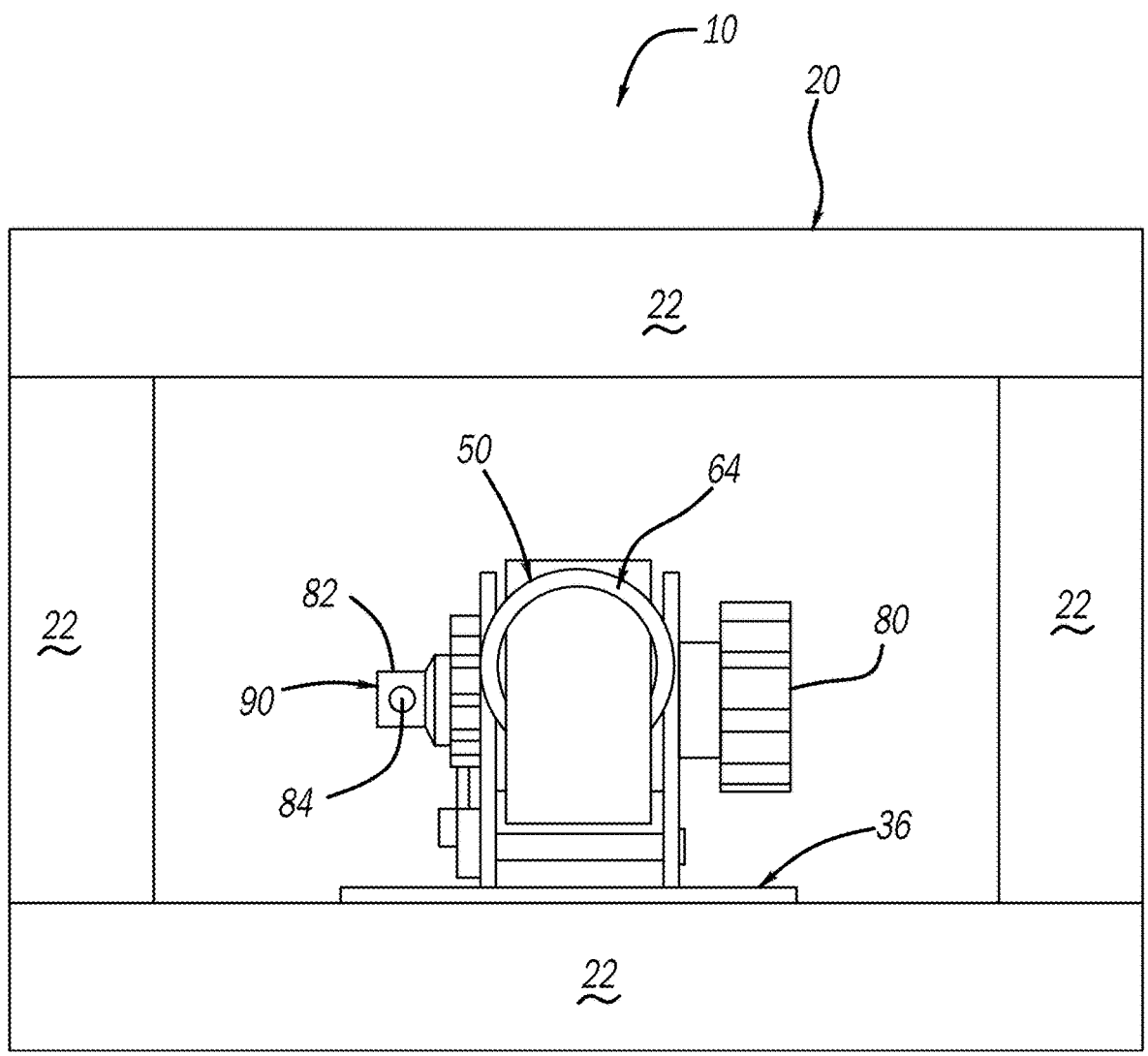
FIG. 3 is a third view of a stone-removing device showing the D-ring of the winch-like unit.

With reference again to the winch-like unit 30, a commercially available truck rack tie-down may function as a winch-like unit 30, and may be provided by PROGRIP or USA Products Group, Inc. of Lodi, California, for example. A ratcheted reel or spool 32 within the unit 30 houses a web or belt 50 spooled about the reel or spool 32 and rotatable about an axis 34. A hook or belt connector 60 is formed from metal, steel, or any other tough material, and is sewn within a sleeve or otherwise fixed to a distal or open end 62 of the belt 50. A hook-accommodating rail 70 is juxtaposed to the bracket 36, for securing the hook 60 thereto during periods of storage of the stone-removing device 10. As shown in FIG. 3 and further explained below, a D-ring or hook connector 64 is slipped about the belt 50, for slidable engagement over the belt 50. As further discussed below, once the belt connector or hook 60 is hooked to the hook connector or D-ring 64, the belt 50 is tightened about an object stuck between the dual tires of a tractor trailer for example, to remove the object.

Figure 2:
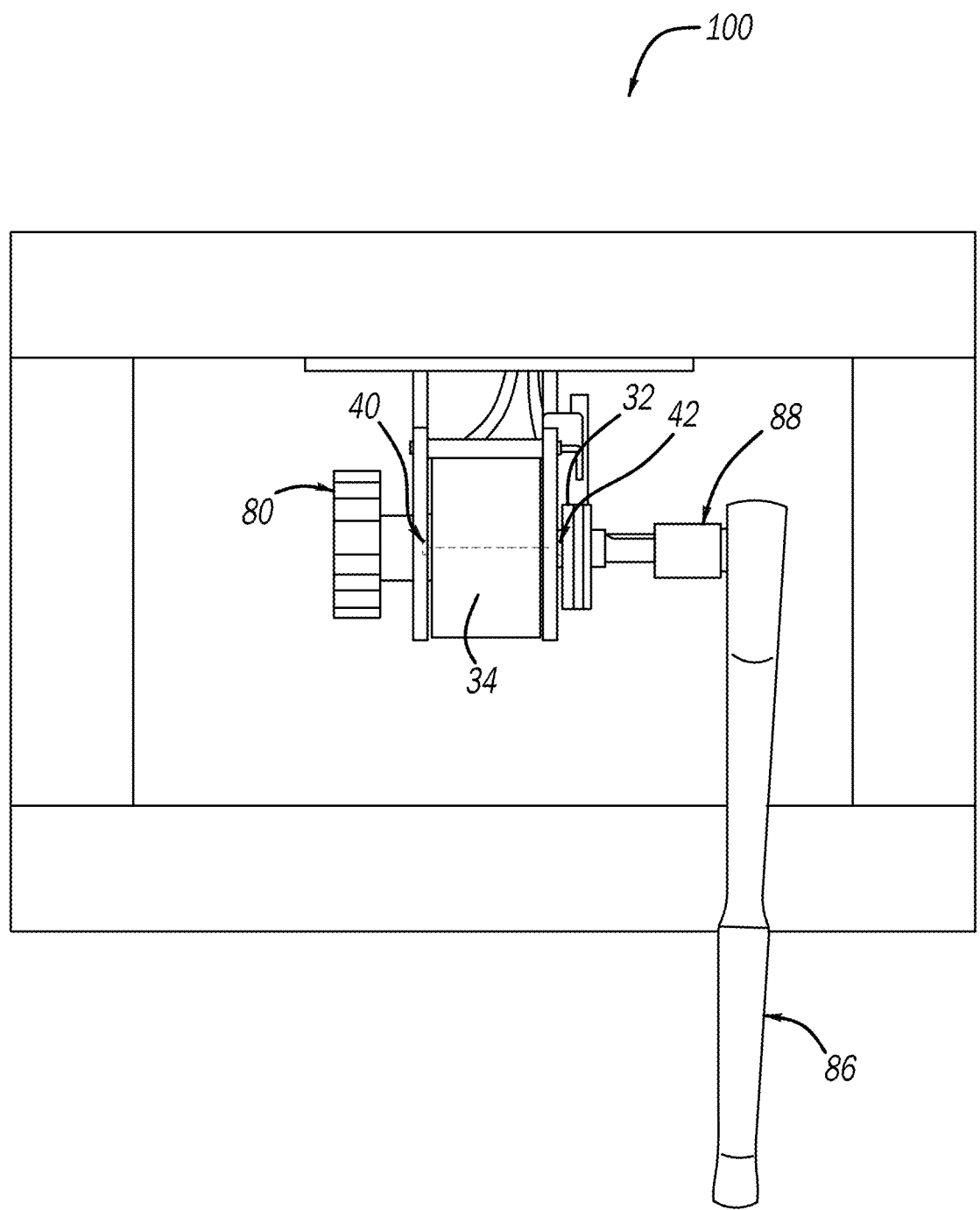
FIG. 2 is a second view of a stone-removing device with an exemplary hand tool to operate the device, in accordance with the present invention.

Again, with reference to the unit 30, a hand-tightening knob 80 is fixed to the first outer end 40 of the axis 34, for hand tightening of the slack of the belt 50 once the belt is wrapped about an object between the two tires. A tool-operated connection element 82 is fixed to the second outer end 42 of the axle 34 of the unit 30 and the spool 32, for mating with a desired hand tool 86. In a stone-removing system 100 of the present invention, a crescent wrench, a box wrench, a ninety-degree or L-shaped angle bar for fitting within an aperture or hole 84 in the connection element 82, or a ratchet socket wrench (shown in FIG. 2) all exemplify a desired tightening hand tool 86 that may be used to tighten the belt 50 by ratcheting the uptake of the belt 50 on the reel 32. As shown in FIG. 2, for example, the aperture 84 may be formed within the connection element 82, and transversely across the diameter of the connection element 82. A drive socket adapter 88 sized at ¼-inch, ⅜-inch, or ½-inch, for example, may be fixed to the working end of the ratchet socket wrench 86 for mating with the connection element 82. A recessed portion 90 axially extends within the tool end of the connection element 82, and is formed to mate with a desired and corresponding size of the drive socket adapter 88, for ratcheting the spool 32 attached thereto. A periphery 92 of the connection element 82 may be defined by a hexagonal or other geometric outer surface, for mating with a socket of a ratchet wrench, or a crescent wrench, or an open-end box wrench, for example. See FIG. 2.

By designing the connection element 82 to accommodate a number of tools 86, any of these or other tools that are conveniently on hand for the driver of the vehicle may be used with the stone-removing device 10. Yet further, as further described below, the current challenge of providing sufficient leverage within a confined space is overcome in that it is the leverage formed against the stone, as defined between the belt and the treads of the dual tire configuration that is used to remove the stone, wood, or other foreign objects lodged between the dual tires. In contrast to current stone removal devices that utilize a relatively longer profile in a lever or long arm to force the stone out, the present device 10 utilizes the strength of the strap levered by the frame 20, while maintaining a low profile to clear the fenders or other structure found beneath the truck, bus, or vehicle.

Figure 4:
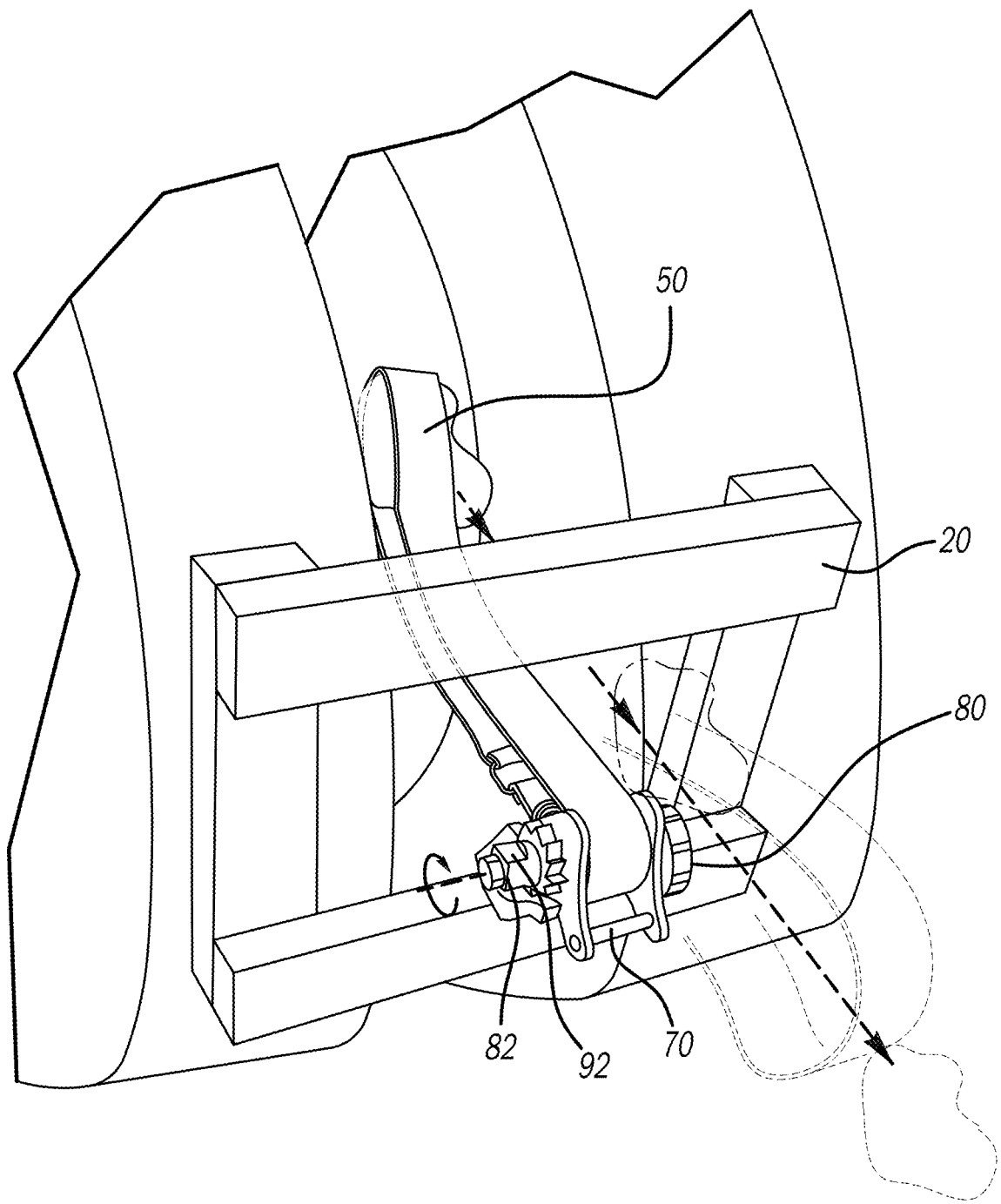
FIG. 4 is a fourth view of a stone-removing device showing the strap wrapped about an object stuck between coaxial dual tires, in preparation for tightening the strap and removing the object.

In use, the stone-removing device 10 is brought to the affected pair of tires for removal of a foreign object such as a stone, rock, or other debris stuck between the dual tires. The belt 50 is wrapped around the object or objects stuck between the dual tires, and the hook 60 at the distal end 62 of the belt 50 is pulled around the object and connected to the D-ring 64. Next, the hand-tightening knob 80 is operated to tighten the slack of the belt 50, so that the frame 20 is positioned or biased against the lateral periphery along the treads of the tires. By hand tightening the belt 50, the frame 20 can be positioned against the tires for applying a counterforce to the force required to expel the object from between the tires. See FIG. 4. Next, the exemplary hand tool 86, preferably a socket wrench that may be used with a ⅜-inch fitting on the connection element 82, for example, is connected to the connection element 82. See FIG. 2. The socket wrench 86 is used to rotate the ratcheted reel 32 to tighten the belt 50 as it is reeled in. As the belt 50 is tightened, the force exerted by the frame 20 against the tires is believed to be close if not equivalent to the force exerted against the object the strap 50 wrapped around it. Eventually, and as shown in FIG. 4, the force F1 applied against the tires by the frame 20 overcomes the force F2 needed to extract the object from between the tires, as applied by the belt 50.

It should be appreciated that in multi-axle trucks and trailers and vehicles, if multiple stones or debris are lodged in more than one set of dual tires, such as in two sets of dual tires aligned along the length of the trailer, the belt 50 may be elongated (e.g. eight feet long) and wrapped about the debris in one set of dual tires and then wrapped about the second set of dual tires toward the back of the vehicle. The hook 60 may then be connected to the clasp or D-ring 64, and both obstructions may be removed by again tightening the belt about both obstructions as explained herein, and leveraging the frame 20 against and across the tread of the rear tires, for example. Benefits include less time to remove the objects, and less effort to remove the objects, whereby maintenance and removal of obstructions between the tires is enthusiastically maintained. Other benefits include that the present device 10 may be used in most if not all dual-tire vehicles. In contrast, other tools known in the art are often specifically designed for specific vehicles. Maintenance of the tires is also more cost-effective and easier to accomplish. In sum, the present invention is extremely useful in various multi-axle truck/trailers having two to seven axles over the length of the truck and trailer.

In yet another aspect of the invention, a method for removing foreign objects from the dual tire configuration of a vehicle includes the following steps:
(1) providing a spool and belt wound on the spool fixed to a frame;
(2) wrapping a free end of the belt, preferably containing a hook, about a stone or debris between the dual tire configuration;
(3) securing the free end or hood of the belt back to a connection such as a D-ring on the belt; and
(4) tightening the belt about the spool and the foreign object to leverage the frame against the vehicle, until the foreign object is removed.

In furtherance accordance with the method and invention, the tightening step is done by ratcheting the spool with a tool mated to the spool. In yet another aspect of the method, the frame may be leveraged against the dual tire configuration of the vehicle to force the object from between the dual tire configuration as the spool is tightened.

While a preferred embodiment of the invention has been disclosed in detail, it should be understood by those skilled in the art that various other modifications may be made to the illustrated embodiments without departing from the scope of the invention as described in the specification and defined in the appended claims.

What is claimed is:

1. A stone-removing system for a dual tire configuration of a vehicle comprising:
   a frame;
   a winch unit fixed to the frame, said winch unit containing a rotatable spool and a belt wound about the spool, said belt adapted to be wrapped about an object stuck between the dual tires;
   a first connecting member located at a distal and open end of said belt;
   a second connecting member slipped about the belt for engagement with said first connecting member, to tighten the belt about the object; and
   a tool for tightening the belt by rotating the spool,
   whereby said frame is adapted to be leveraged against a portion of the vehicle for removal of a stone stuck between the tires as the belt, as the belt is secured about the object and tightened on the spool.

2. The stone-removing system of claim 1 wherein said rotatable spool is a ratcheted spool.

3. The stone-removing system of claim 1 further comprising a tool-operated connection element coaxially positioned with said spool for mating with said tool to tighten said belt.

4. The stone-removing system of claim 3 wherein said tool is selected from a ratchet handle, a crescent wrench, an open-end wrench, or an L-shaped bar.

5. The stone-removing system of claim 4 wherein said tool-operated connection element contains an axial recess for mating with a drive socket adapter for tightening said belt.

6. The stone-removing system of claim 4 wherein said tool-operated connection element contains a transverse aperture adapted to receive said L-shaped bar for tightening said belt.

7. The stone-removing system of claim 1 wherein said first connecting member is a hook.

8. The stone-removing system of claim 7 wherein said second connecting member is a hook connecting member.

9. The stone-removing system of claim 8 wherein said hook connecting member is a D-ring.

10. The stone-removing system of claim 1 wherein said frame is formed from a plurality of frame members to form a rectangular frame.

11. The stone-removing system of claim 1 wherein said frame is leveraged against treads of the dual tire configuration.

12. A stone-removing device for a dual tire configuration of a vehicle comprising:
    a frame;

a winch unit fixed to the frame, said winch unit containing a rotatable spool and a belt wound about the spool, said belt adapted to be wrapped about an object stuck between the dual tires;

a first connecting member located at a distal and open end of said belt; and a second connecting member slipped about the belt for engagement with said first connecting member, to tighten the belt about the object;

whereby said frame is adapted to be leveraged against a portion of the vehicle for removal of a stone stuck between the tires as the belt secured about the object is tightened on the spool.

13. The stone-removing device of claim 12 wherein said rotatable spool is a ratcheted spool.

14. The stone-removing device of claim 12 further comprising a tool-operated connection element coaxially positioned with and fixed to said spool for mating with a tool to tighten said belt.

15. The stone-removing system of claim 14 wherein said tool is selected from a ratchet handle, a crescent wrench, an open-end wrench, or an L-shaped bar.

16. The stone-removing system of claim 14 wherein said tool-operated connection element contains an axial recess for mating with a drive socket adapter and a ratchet wrench for tightening said belt.

17. The stone-removing system of claim 14 wherein said tool-operated connection element contains a transverse aperture adapted to receive said L-shaped bar for tightening said belt.

18. A method of removing a foreign object from between a dual tire configuration of a vehicle comprising the steps of:

providing a spool and belt wound on the spool fixed to a frame;

wrapping a free end of the belt about a stone or debris between the dual tire configuration;

securing the free end of the belt back to a connection on the belt; and tightening the belt about the spool and the foreign object to leverage the frame against the vehicle, until the foreign object is removed.

19. The method of claim 18 wherein the tightening step is done by ratcheting the spool with a tool mated to the spool.

20. The method of claim 18 wherein the frame is leveraged against the dual tire configuration to force the object from between the dual tire configuration as the spool is tightened.

* * * * *